UNITED STATES PATENT OFFICE.

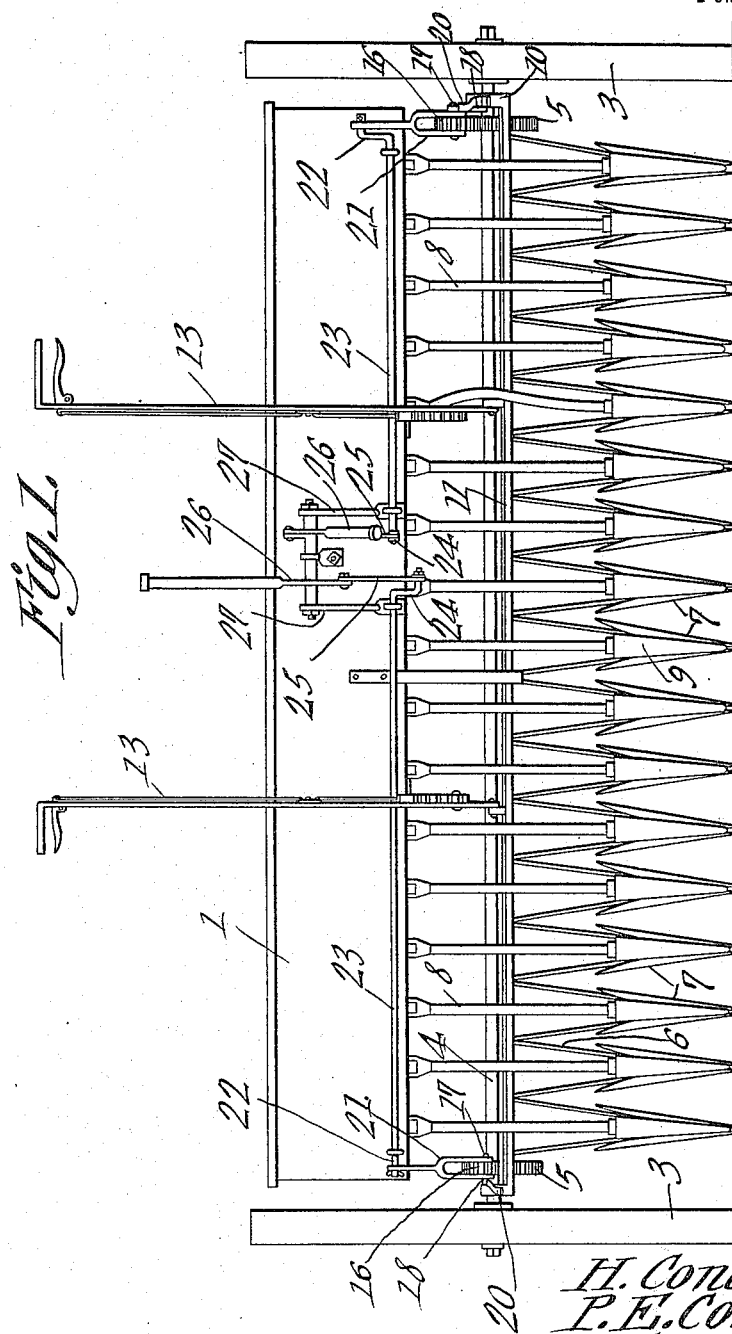

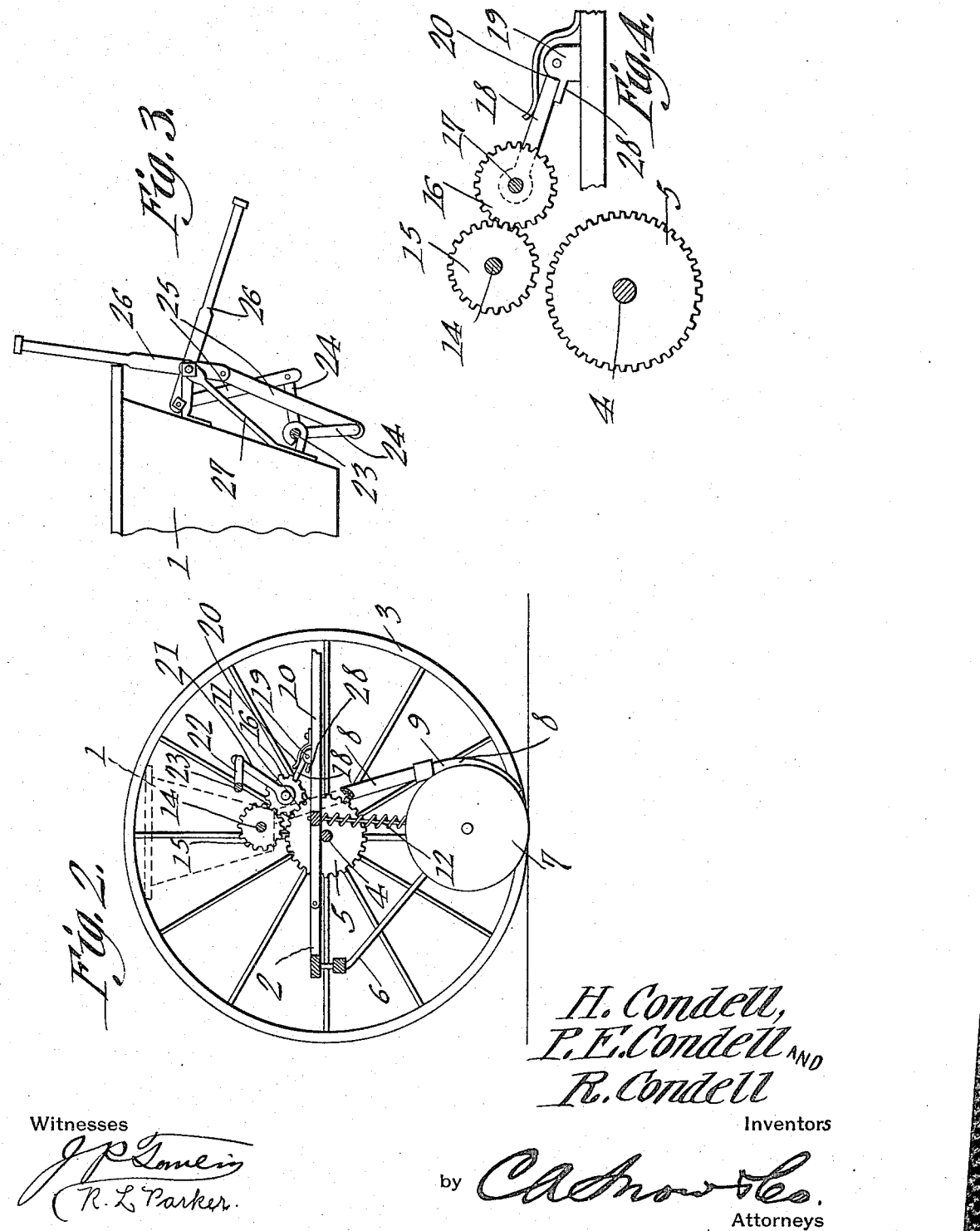

HENRY CONDELL, PAUL E. CONDELL, AND RICHARD CONDELL, OF TROY, IDAHO.

DRILL ATTACHMENT.

1,167,545.  Specification of Letters Patent. Patented Jan. 11, 1916.

Application filed May 25, 1915. Serial No. 30,363.

*To all whom it may concern:*

Be it known that we, HENRY CONDELL, PAUL E. CONDELL, and RICHARD CONDELL, citizens of the United States, residing at Troy, in the county of Latah, State of Idaho, have invented a new and useful Drill Attachment, of which the following is a specification.

This invention relates to an attachment for seed drills and is more particularly designed for use in connection with the well known Van Brunt drill wherein a gang of disks is arranged adjacent the seed tubes or spouts, mechanism being provided whereby when the gang of disks is raised, the seed dropping mechanism is uncoupled from its driving means. Heretofore, when it has been desired to uncouple the seed dropping mechanism from its actuating means, it has been necessary to lift the entire weight of the disk and its frame and this has required considerable strength and effort which at time necessitates stopping the drill before the disks can be raised.

One of the objects of the present invention is to provide an attachment for a drill of the type described whereby the uncoupling of the seed dropping mechanism from its driving means can be readily effected with little effort, and without the necessity of raising the disks although, when said disks are raised, the seed dropping mechanism will be uncoupled as heretofore.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a rear elevation of a seed drill having the present improvements combined therewith. Fig. 2 is a vertical longitudinal section through a portion of the drill and the improvements combined therewith, the seed hopper being indicated by dotted lines. Fig. 3 is a side elevation of a portion of the hopper and showing the controlling lever and the parts operated thereby. Fig. 4 is a side elevation of the gears.

Referring to the figures by characters of reference 1 designates a hopper suitably mounted on a wheel supported frame 2, the supporting wheels 3 being adapted to rotate an axle 4 to which is secured a drive gear 5. Connected to the front portion of the frame 2 are rearwardly diverging draw bars 6, to the rear ends of which are connected disks 7 disposed in pairs, there being seed spouts 8 interposed between the disks of each pair and connected to the bottom of the hopper 1 by tubes 9 as ordinarily. Side arms 10 are pivotally connected to the sides of frame 2 and are connected by a cross bar 11 and this bar, in turn, is suitably connected to the draw bars 6 whereby, when the supplemental frame made up of arms 10 and cross bar 11 is swung upwardly, the disks 7 and the parts connected thereto will be lifted from the ground. The connections between the bar 11 and the draw bars 6 have been indicated generally at 12 and may include springs whereby a yielding connection is provided. The means employed for lifting the supplemental frame includes levers 13. Preferably two supplemental frames are used, each being adjustable upwardly and downwardly by its own lever 13.

The construction and operation of the parts thus far described need not, it is thought, be described and illustrated in detail for the reason that it is of a type well known to the trade as the Van Brunt drill and constitutes no part of the present invention.

As heretofore pointed out, it has been the practice, in machines of this type, to provide the shaft 14 of the seed dropping mechanism in the hopper 1 with a gear 15 and motion has been transmitted to this gear through an intermediate gear from the gear 5 on axle 4. This intermediate gear has been mounted so as to move with the supplemental frame and whenever it has been desired to disengage the intermediate gear from the drive gear 5 it has been necessary to elevate the supplemental frame and the load carried thereby, this requiring considerable strength. In the present structure an intermediate gear 16 is employed, this gear being carried by a shaft 17 which is journaled in an arm 18, the said arm being pivotally connected to the supplemental frame as shown at 19 and being held normally in mesh with gear 5 by a spring 20. Gear 16 is constantly in mesh with the gear 15. A yoke 21 is pivotally mounted on shaft 17 and is pivotally connected to a crank arm 22 at the outer end of a shaft 23 which is journaled upon the back of the hopper 1.

It is to be understood of course that two sets of gears are provided, one for each of the supplemental frames and, consequently, two shafts 23 are employed, these shafts being disposed in alinement upon the back of the hopper 1. The inner end of each shaft 23 has a crank arm 24 and each crank arm is connected by a link 25 to a lever 26 fulcrumed between brackets 27 extending from the hopper 1. Each crank arm 24 is disposed at right angles to the crank arm 22 at the other end of the shaft thereof so that, when crank arm 24 is extended downwardly, the crank arm 22 on the same shaft therewith is extended horizontally or rearwardly. Furthermore, when the crank arm 24 is extended downwardly, the lever 26 coupled thereto is pressed forwardly against the back of the hopper 1 so that a lock is thus formed and it is impossible for the crank arm 24 to swing upwardly until after the lever 26 has been swung rearwardly to bring its connection with link 25 past the dead center. When lever 26 is in its raised or locked position, the outer crank arm 22 controlled thereby is extended rearwardly to thus hold the gear 16 in mesh with the gears 5 and 15. When, however, lever 26 is swung rearwardly out of its locked position, the inner crank arm 24 will be pulled upwardly, thus raising the outer crank arm 22 past its dead center and causing gear 16 to move and be held out of mesh with gear 5, this movement being against the action of spring 20. Consequently the operation of shaft 14 will be stopped, without the necessity of lifting all of the disks and the parts carried thereby. It will of course be understood that when the disks are raised in the usual manner, the gear 16 will be moved out of mesh with gear 5, a stop device 28 being extended under the arm 18 so as to cause said arm to move upwardly with the supplemental frame and thus insure the disengagement of gear 16 from gear 5.

Obviously various changes in the way of mounting the parts can be devised and different kinds of soil engaging devices can be used, without departing from the spirit of the present invention.

What is claimed is:—

1. In a drill, the combination with a hopper, a revoluble axle and a gear movable with the axle, and a gear carried by the hopper, of a frame angularly adjustable below the hopper, soil engaging devices movable therewith, an intermediate gear carried by said frame and normally meshing with the first named gear, and means for shifting said gear out of mesh with the axle gear, said means being independent of the frame.

2. In a drill, the combination with a hopper, a gear thereon, a revoluble axle, a gear thereon, an angularly adjustable frame, soil engaging devices carried thereby, and means for adjusting the frame, of an intermediate gear normally meshing with the first named gear and shiftable out of mesh with the axle gear when the frame is raised, and means for shifting said intermediate gear independently of the frame to disengage it from the axle gear.

3. In a drill, the combination with a hopper, a gear thereon, a revoluble axle, a gear thereon, an angularly adjustable frame, soil engaging devices carried thereby, and means for adjusting the frame, of a yieldingly held intermediate gear carried by the frame and normally meshing with the axle gear, said intermediate gear being movable upwardly with the frame and out of engagement with the axle gear, a lever, and means operated thereby for shifting the intermediate gear out of mesh with the axle gear independently of the movement of the frame, said means constituting a lock for holding the intermediate gear in disengaged position.

4. An attachment for drills of the class described, including bearing members for attachment to a hopper, a lever supported by one of said members, a shaft supported by certain of said members and having a crank arm at each end, said crank arms being disposed at right angles to each other, a link connection between one of the crank arms and the lever, a yoke pivotally connected to the other crank arm, an intermediate gear supported by the yoke, means for movably connecting the intermediate gear to the adjustable frame of a drill, and yielding means for holding the gear normally in a predetermined position on said frame.

In testimony that we claim the foregoing as our own, we have hereto affixed our signatures in the presence of two witnesses.

HENRY CONDELL.
    PAUL E. CONDELL.
    RICHARD CONDELL.

Wtinesses:
  JAMES S. ROGERS,
  F. I. CUNNINGHAM.

Copies of this patent may be obtained for five cents each, by addressing the "Commissioner of Patents, Washington, D. C."